Nov. 22, 1960
N. EMMONS III
2,960,774
PNEUMATIC GAGING APPARATUS
Filed March 13, 1956
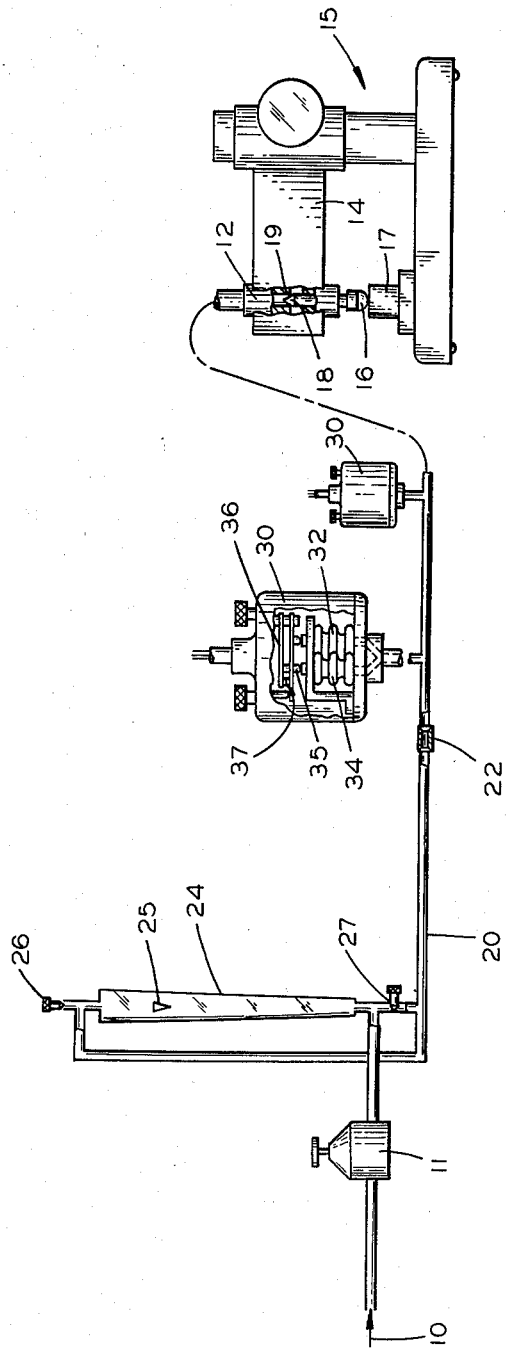
INVENTOR.
Nelson Emmons III
BY Edward J. Noe Jr.
atty.

United States Patent Office 2,960,774
Patented Nov. 22, 1960

2,960,774

PNEUMATIC GAGING APPARATUS

Nelson Emmons III, Dayton, Ohio, assignor, by mesne assignments, to The Sheffield Corporation, a corporation of Ohio Filed Mar. 13, 1956, Ser. No. 571,192

4 Claims. (Cl. 33—147)

This invention relates to gaging devices and more particularly to a gaging apparatus of the air leakage type controlled by product dimensions, machine movements and the like.

In gaging systems wherein an instrument, for example of the type employing a light indicating float movable within an internally tapered flow tube, is connected between a gage head controlled by the work and a source of fluid under pressure, flow changes and float response are substantially instantly responsive to changes in leakage through the gage head. However, in such systems the conversion of flow conditions to electric signals has not been previously accomplished in a simple and economical fashion. Accordingly it has been prior practice to employ systems of the back-pressure type having a restriction which substantially restricts flow to form a pressure chamber to which are connected pressure responsive control means. This type system is inherently slower in response.

It is accordingly an object of the present invention to provide a gaging apparatus of the air leakage type wherein gaging responses are instantly obtained regardless of the remoteness of gage head location and which is utilized in a simple manner to actuate switches and the like for machine control, part segregation, and like functions.

It is a further object to provide such an apparatus providing indicating means which are substantially instantly responsive and having pressure responsive means to operate electric or other control devices.

It is a further object to provide a gaging apparatus wherein an air flow passage connected to a gage head includes a restriction which offers but little resistance to air flow, the apparatus having indicating means of the rate of flow type between the restriction and air source and pressure responsive control means connected between the restriction and gage head whereby indications are substantially instantly obtained and the control means is substantially instantly responsive during gaging.

It is a further object to provide such an apparatus wherein the indicating means comprises a vertically disposed internally tapered flow tube having an indicating float movable therealong and the control means is provided by a pressure responsive movable member and switch means actuated thereby.

Other objects and advantages of the invention will be apparent from the following description, the appended claims, and the accompanying drawing in which is illustrated an exemplary gaging apparatus embodying the present invention.

The present invention provides a simple gaging apparatus which is economical in construction and reliable in operation, and wherein substantially instantaneous gaging responses are obtained for machine control and the like.

In the particular apparatus illustrated air supplied from a suitable source indicated at 10 flows through a regulator 11 adjustable for the desired pressure. A gage head 12 at the other end of the apparatus is supported in an adjustable arm 14 of a comparator 15.

In this application the gage head 12 includes a work contactor 16 engaging a workpiece 17. The tapered inner end 18 of the work contacting plunger cooperates with an orifice 19 in the head body to control the flow therethrough in accordance with the dimension of the workpiece.

Passage 20 communicates between regulator 11 and gage head 12 and the flow therethrough is determined by the position of the plunger and leakage through the head. A restriction 22 is included in passage 20 which is of a comparatively large size, offering but little restriction to flow through passage means 20. For example a restriction can be used having a cylindrical passage about .06 inch long and slightly less than .05 inch in diameter. Because of its large size, restriction 22 has no substantial effect on flow through the passage 20 and pressures on opposite sides of the restriction differ only a minor degree during gaging. Flow changes in passage means 20 are substantially instantly responsive to changes in leakage through gage head 12.

A portion of passage 20 is formed as a vertically disposed internally tapered flow tube 24 having an indicating float 25 movable therealong in accordance with the velocity of flow upward through the tube. Such an indicator comprises an adjustable relief at 26 to vary the amount of air escaping directly to atmosphere for adjustment of float position. Another adjustment is provided at 27 to vary the amount of air by-passed directly from regulator 11 to the gage head and around flow tube 24. Through use of adjustment 27 the amplification can be varied.

Control or signal units 30 are connected to passage 20 between restriction 22 and gage head 12. The control unit of co-pending application No. 543,408 filed October 28, 1955, now Patent No. 2,878,334 issued March 17, 1959, can be used in a system as illustrated and such a unit is diagrammatically shown for purposes of illustration.

In each unit 30 a pair of bellows 32 and 34 in communication with passage 20 flex in accordance with the pressure between restriction 22 and gage head 12 resulting from variations in leakage through the gage head and the dimension of the article gaged. Each of the bellows is independently connected for actuation of a switch set in accordance with a predetermined pressure and predetermined work dimension in this example. For example, bellows 34 after a predetermined upward expansion will actuate projection 35 to flex spring leaf 36 upward and separate switch contacts 37. A series of such pressure controlled switches can be employed to obtain signals at different dimensions of the workpiece 17. The signals obtained from such a control unit can be applied for many different applications such as machine control, part segregation and the like.

Because of the minor restriction offered by restriction 22 the indicating float 25 will be substantially instantly responsive to changes in work dimension and variations in leakage through gage head 12. Restriction 22 does offer enough restriction so that sufficient pressure variation is obtained for the actuation of the contacts within control units 30.

Thus it is seen that a gaging apparatus has been provided of extremely simple character and in which substantially instant indications and control responses can be obtained as determined by part dimensions and the like.

It is understood that this invention is not limited to the precise apparatus illustrated but that changes may be made therein without departing from the scope of the invention which is defined in the appended claims.

What is claimed is:

1. Air gaging apparatus comprising a gage head for controlling fluid flow in accordance with a gaged condition, means providing a passage adapted for connection to a source of air under controlled pressure and leading to said gage head, a fixed restriction in said passage offering such restriction to flow that the pressures on opposite sides thereof differ only a minor degree within the gaging range, rate of flow indicating means upstream of said restriction substantially instantly responsive to changes in flow through said gage head, and a pressure responsive signal element connected to said passage between said restriction and said gage head, said restriction being of such size as to obtain pressure changes for operation of said pressure responsive signal element while allowing substantially free flow for operation of said rate of flow indicating means.

2. Air gaging apparatus comprising a gage head for controlling fluid flow in accordance with a gaged condition, means providing a passage adapted for connection to a source of air under controlled pressure and leading to said gage head, a restriction in said passage offering such restriction to flow that the pressures on opposite sides thereof differ only a minor degree within the gaging range, a portion of said passage upstream of said restriction being formed as a vertically disposed transparent flow tube having an internal taper, a float movable within said flow tube and substantially instantly responsive to changes in flow through said gage head, a pressure responsive element connected to said passage between said restriction and said gage head, and switch means actuated by said element at a predetermined pressure within the passage, said restriction being of such size as to obtain predetermined pressure changes for operation of said pressure responsive element while allowing substantially free flow for positioning of said float along said tube to provide substantially instantaneous response thereof.

3. Air gaging apparatus comprising a gage head for controlling fluid flow in accordance with a gaged condition, means providing a passage adapted for connection to a source of air under controlled pressure and leading to said gage head, a restriction in said passage offering such restriction to flow that the pressures on opposite sides thereof differ only a minor degree within the gaging range, a portion of said passage upstream of said restriction being formed as a vertically disposed transparent flow tube having an internal taper, a float movable within said flow tube and substantially instantly responsive to changes in flow through said gage head, a plurality of pressure responsive expansible chambers, means independently connecting each of said chambers to said passage between said restriction and said gage head, and a set of switch contacts of each of said chambers actuated independently by the respective chambers at predetermined pressure conditions within the passage as determined by flow through the gage head.

4. Air gaging apparatus comprising a gage head for controlling flow in accordance with a gaged condition, means providing a passage adapted for connection to a source of air under controlled pressure and leading to said gage head, rate of flow indicating means connected to said passage substantially instantly responsive to changes in flow through said gage head, said indicating means including a vertically disposed transparent flow tube having an internal taper and forming a portion of said passage, a flow responsive float movable within said flow tube, pressure responsive means connected to said passage downstream of said indicating means, a series of adjustable switch means actuated by said pressure responsive means at predetermined pressure conditions within the passage as determined by flow through the gage head, the passage means between said flow responsive indicating means and said pressure responsive means having such restriction to flow as to cause a pressure drop thereacross under flow conditions within the gaging range of the apparatus.

References Cited in the file of this patent
UNITED STATES PATENTS

| | | |
|---|---|---|
| 2,448,653 | Aller | Sept. 7, 1948 |
| 2,691,827 | Aller | Oct. 19, 1954 |
| 2,706,397 | Byrkett | Apr. 19, 1955 |
| 2,786,109 | Esken | Mar. 19, 1957 |
| 2,796,671 | Aller | June 25, 1957 |